United States Patent [19]

Gusching

[11] Patent Number: 5,007,151
[45] Date of Patent: Apr. 16, 1991

[54] MACHINE TOOL TURRET

[75] Inventor: Nagle V. Gusching, Sidney, Ohio

[73] Assignee: The Monarch Machine Tool Company, Sidney, Ohio

[21] Appl. No.: 389,268

[22] Filed: Aug. 3, 1989

Related U.S. Application Data

[63] Continuation-in-part of Ser. No. 263,041, Oct. 26, 1988, Pat. No. 4,856,153.

[51] Int. Cl.$^5$ .................. B23B 7/04; B23B 39/20
[52] U.S. Cl. .................... 29/33 J; 29/27 C; 29/39; 82/117
[58] Field of Search ............... 29/40, 39, 568, 48.5 A, 29/53, 33 J, 36, 27 C, 27 A, 27 R; 82/124, 125, 120, 121, 129, 159, 152, 117

[56] References Cited

U.S. PATENT DOCUMENTS

| | | | |
|---|---|---|---|
| 3,186,085 | 6/1965 | Coate | 29/568 |
| 3,186,266 | 6/1965 | Coate | 29/568 |
| 3,296,903 | 1/1967 | Coate | 29/568 X |
| 3,316,786 | 5/1967 | Coate | 29/568 |
| 3,477,121 | 11/1969 | Martin | 29/568 |
| 4,051,583 | 10/1977 | Kato et al. | 29/40 |
| 4,087,890 | 5/1978 | Ishizuka et al. | 29/40 X |
| 4,570,313 | 2/1986 | Holmstrom et al. | 29/26 A |
| 4,635,329 | 1/1987 | Holy et al. | 29/27 C |
| 4,643,623 | 2/1987 | Kondo et al. | 409/232 |
| 4,646,422 | 3/1987 | McMurtry | 29/568 |
| 4,683,626 | 8/1987 | Stewer | 29/40 |
| 4,704,773 | 11/1987 | Quinart et al. | 29/27 C |
| 4,738,170 | 4/1988 | Isawa et al. | 29/40 |
| 4,777,713 | 10/1988 | Kitamura | 82/117 X |

FOREIGN PATENT DOCUMENTS

| | | | |
|---|---|---|---|
| 2753386 | 5/1979 | Fed. Rep. of Germany | 29/40 |
| 94201 | 5/1985 | Japan | 29/27 C |

OTHER PUBLICATIONS

Yamazaki Mazar Corp. Brochure; pp. 1-20; 1986.

Primary Examiner—William Briggs
Attorney, Agent, or Firm—Pearne, Gordon, McCoy & Granger

[57] ABSTRACT

A machine tool turret, usable in a machine tool having a rotatable workpiece spindle, that includes first and second tool spindles journaled on the turret. The turret is mounted for compound movement in an x-c plane defined by an x axis perpendicular to the c axis of the work spindle. Each tool spindle may be locked against rotation or, alternatively, it may be rotated. In either case, the operative position of each tool spindle may be used in the machining of a workpiece which also may be rotating or non-rotating. The turret axis is perpendicular to the x-c plane so that as the turret is rotated the tool spindles remain in this x-c plane for a plurality of operative positions for machining. The foregoing abstract is merely a resume of one general application, is not a complete discussion of all principles of operation or applications, and is not to be construed as a limitation on the scope of the claimed subject matter.

5 Claims, 4 Drawing Sheets

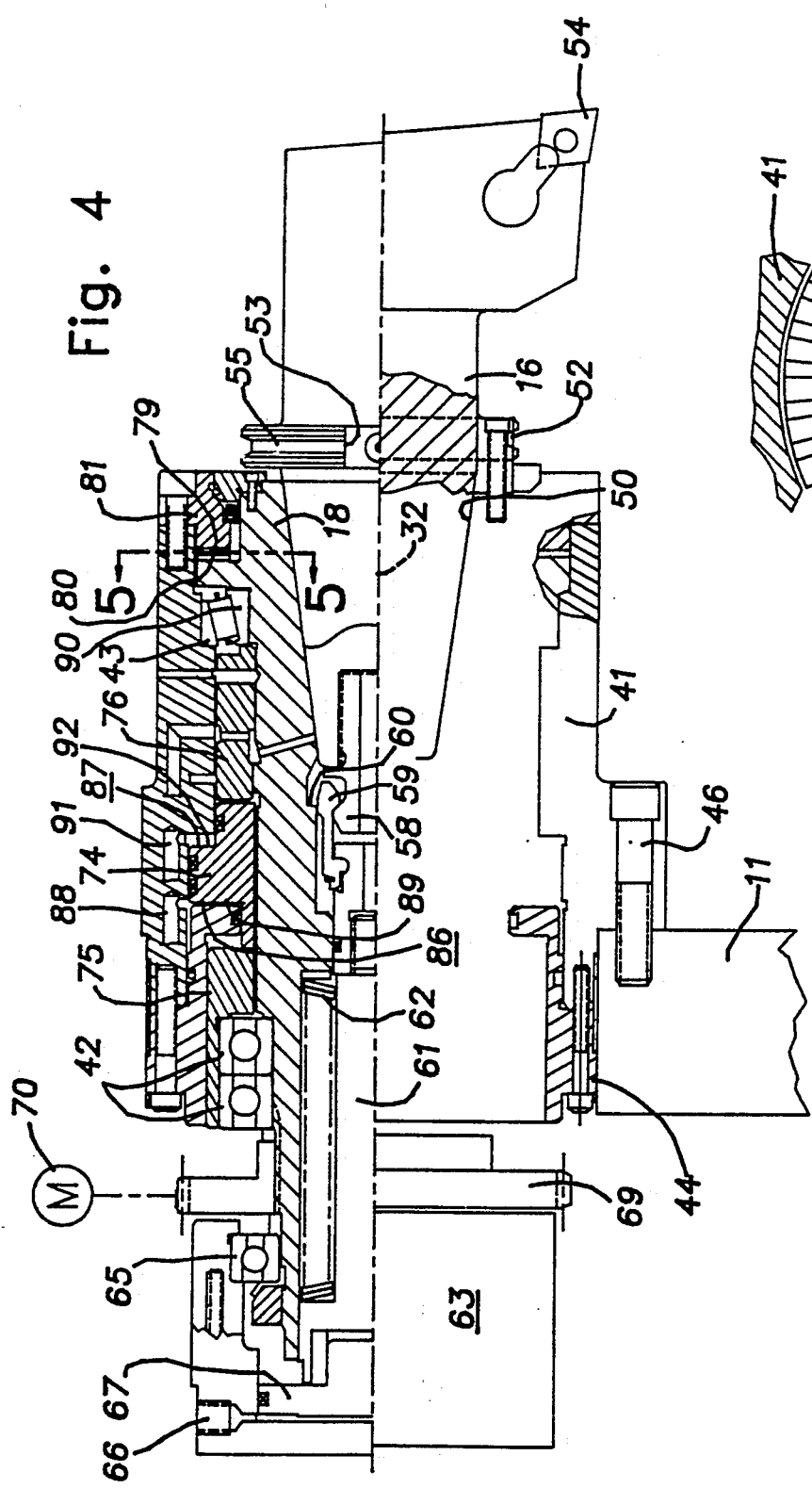

MACHINE TOOL TURRET

This application is a continuation-in-part of my patent application Ser. No. 07/263,041, filed Oct. 26, 1988, now U.S. Pat. No. 4,856,153, "SPINDLE MECHANISM".

BACKGROUND OF THE INVENTION

The machine tool with which this turret is preferably used may be described as a mill/turn machine tool which is capable of milling, turning, drilling, tapping, etc. with a rotating or non-rotating workpiece spindle and a rotating or non-rotating tool spindle in the turret.

A number of turrets have been proposed for machine tools. U.S. Pat. No. 3,186,085 shows a two-place turret for non-rotating turning tools used with a rotating workpiece. U.S. Pat. No. 3,186,266 shows a one-place turret, also for non-rotating turning tools. U.S. Pat. No. 3,296,903 shows a turret type of tool magazine for supplying any one of a multiplicity of non-rotating turning tools into an operative position. U.S. Pat. No. 3,316,786 shows a turret type of tool magazine for non-rotating turning tools. U.S. Pat. No. 4,051,583 discloses a turret with two spindles, each of which can be oriented into an operative position. U.S. Pat. No. 4,643,623 discloses a claw clutch which is engaged when the tool holder is not in the tool spindle and disengaged when inserted in the spindle so it is free to rotate. In U.S. Pat. No. 4,570,313, when the spindle is clamped against rotation, any vibration of the tool in the tool spindle mount as the tool works on a workpiece will be transmitted to the ball bearings despite the presence of the interlocking gear teeth. This can have a damaging effect on the bearings because there is no rolling contact at that time, and such vibration would tend to Brinell the surface of the bearing races.

The Yamazaki or Mazak mill/turn 40N ATC mill center machine is a machine tool of the mill/turn type with two tool holders, one of which is rotatable, and the other of which is only fixed. The turret axis is in the x-c plane so that the tool holders are operative in only two different positions, either 0° or 90° relative to the spindle axis c, with x being the cross slide path.

SUMMARY OF THE INVENTION

The problem to be solved, therefore, is how to construct a machine tool with a turret with two tool holders, each of which may either be rotating or fixed, and with a machine tool having sufficient flexibility to be able to machine a workpiece with the holder in any operative position between 0° and 90° relative to the spindle axis.

This problem is solved by a machine tool turret for a machine tool having a rotatable workpiece spindle rotatable about a c axis, comprising in combination, first and second tool spindles journaled on said turret for rotation about first and second tool axes, respectively, means mounting said turret for compound movement of said tool spindles in an x-c plane defined by an x axis perpendicular to said c axis, and means to lock each said tool spindle against rotation for machining of a rotating workpiece by a non-rotating tool in each said tool spindle, and for machining of a rotating or non-rotating workpiece by a rotating tool in each said tool spindle when unlocked and rotated.

This problem is further solved by a machine tool having a tool turret and a rotatable workpiece spindle rotatable about a c axis, first and second tool holders on said turret and disposed on first and second tool axes, respectively, the turret being mounted for compound movement of the tool holders in a plane defined by said c axis and an x axis perpendicular thereto, characterized by each said tool holder being rotatable about its own axis for machining of a rotating or non-rotating workpiece by a rotating tool in each said tool holder when rotated, and means to lock each said tool holder against rotation in at least one rotational position about its axis for machining of a rotating workpiece by a non-rotating tool in each said tool holder. Non-rotating workpieces might also be machined by a non-rotating tool, e.g., machining graduation marks or even small external keyways.

Accordingly, an object of the invention is to provide a turret in a machine tool with the axis of the turret perpendicular to the plane defined by the spindle axis and the cross slide x axis movement of the turret.

Another object of the invention is to provide a turret with at least two tool holders which move in the cutting plane as the turret indexes.

Other objects and a fuller understanding of the invention may be had by referring to the following description and claims, taken in conjunction with the accompanying drawing.

BRIEF DESCRIPTION OF THE DRAWING

FIG. 4 is a longitudinal view, partly in section, of a spindle in the turret mechanism; and FIG. 5 is a sectional view on line 5—5 of FIG. 4.

DESCRIPTION OF THE PREFERRED EMBODIMENT

Figure 1:
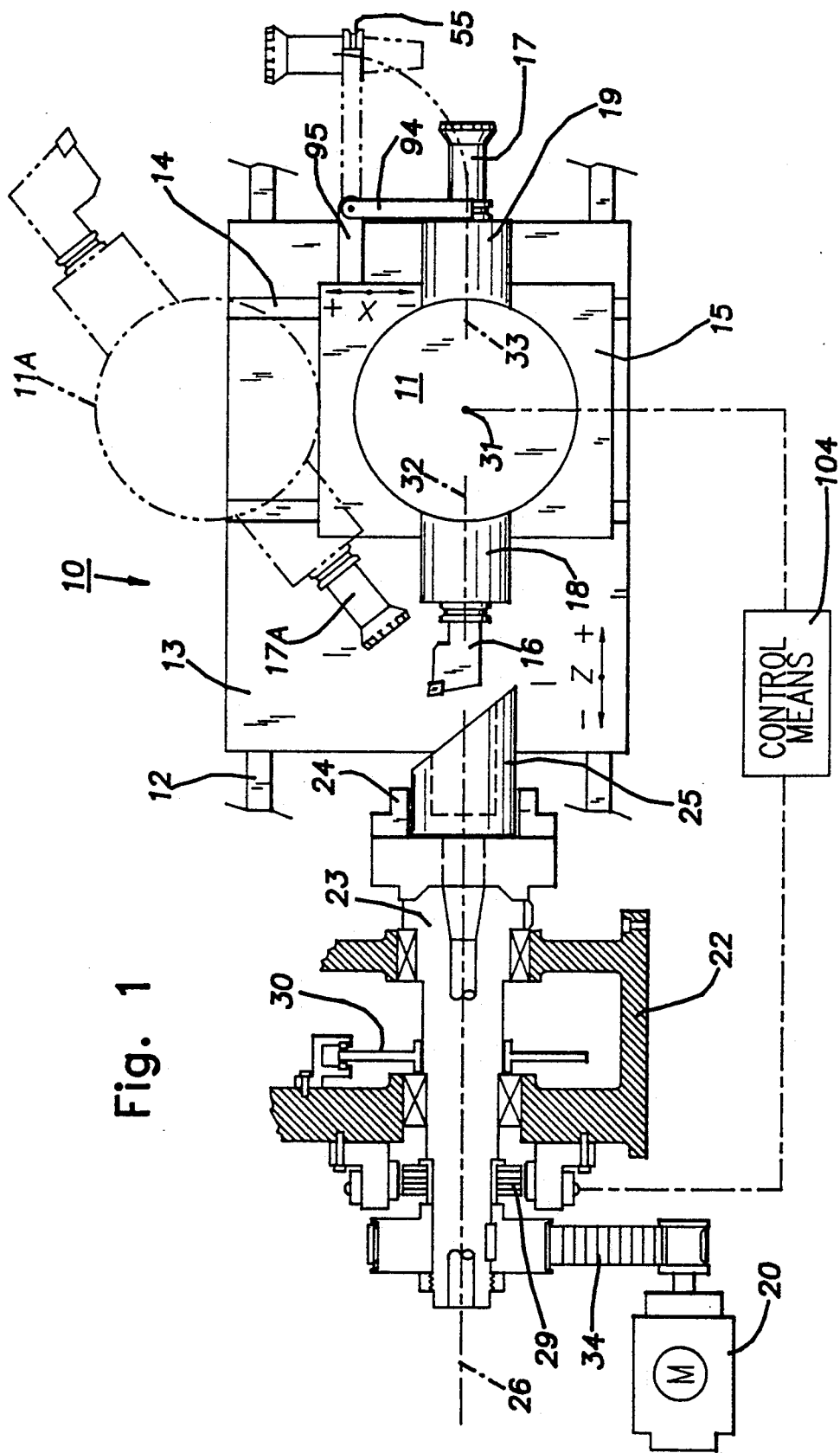
FIG. 1 is a plan view of a machine tool embodying the present invention.

FIG. 1 is a rather diagrammatic view of machine tool 10 embodying the invention, and in particular embodying the turret 11. The machine tool 10 has a frame with bed ways 12 for supporting and defining the z axis motion of a carriage 13. The carriage has cross slide ways 14 supporting and defining the motion of a cross slide 15 along an x axis. The turret 11 has a base on the cross slide 15 so that it has compound movement in the x-z axes. The turret carries a plurality of tool holders shown in this embodiment as two tool holders 16 and 17. These first and second tool holders are carried in first and second tool spindles 18 and 19, respectively, with the tool spindle construction better shown in FIG. 4 described below.

The machine tool 10 also includes a head stock 22 similar to a lathe head stock. This head stock carries a work spindle 23 which may be a collet for bar stock or may be a chuck 24, as shown, to chuck a workpiece 25. The spindle 23 is journaled about a C-axis 26. This head stock 22 is similar to a lathe head stock except that additionally it has stopping and positioning capabilities to be positioned in a locked manner in a multitude of rotational positions diagrammatically illustrated by a non-contacting resolver 29, a caliper brake 30, a cogged drive belt 34, and a main drive motor 20. The resolver 29 is used for accurate positioning of the spindle.

The turret 11 has a turret axis 31 which is perpendicular to the x-z plane or the x-c plane in which the work holders 16 and 17 are mounted. Each tool spindle 18 and 19 has a respective tool spindle axis 32 and 33, and these are radial relative to the turret 11, and in this preferred embodiment are aligned 180° apart on the turret.

FIG. 1 has been described as being a plan view, meaning that the compound movement of the turret in the x-z plane is in a horizontal plane; however, this plane can be disposed vertically if desired; or at a slant angle to the horizontal.

Each of the tool spindles 18 and 19 is capable of being driven in rotation about the respective tool spindle axis, or may be rotatively locked in position as shown in my co-pending patent application Ser. No. 07/263,041, filed Oct. 26, 1988, entitled "SPINDLE MECHANISM". Each of the two tool spindles is identical in construction and, as shown in FIGS. 4 and 5, each tool spindle 18 is shown journaled in a support 41, in this case part of the turret 11, by ball bearings 42 at the rear and by a conical roller bearing 43 near the outer end of the spindle. The support 41 may be mounted on the turret 11 by means of machine screws 46. The support 41 is a generally hollow, tubular structure to carry the rotative spindle 18 journaled therewithin about the longitudinal spindle axis 32. The spindle includes an integral socket, shown as a conical socket 50, to receive the tool holder 16. The spindle has a key 52 entering into a keyway 53 in the tool holder, shown out of position, in order to orient the tool holder to a known position. The tool holder 16 has a cutting tool tip, shown as a tool tip 54, which is oriented by the key 52 in the keyway 53. The tool holder 16 also may have a tool changing flange 55.

The tool holder 16 may have a retention knob 58. This may be engaged by locking fingers 59 which are cammed into engagement with the button 58 by a cam 60 as a central plunger 61 is moved axially inwardly by means of springs, such as Belleville springs 62. A rotary actuator 63 is cantilever-journaled on the rear end of the spindle 18 by a bearing 65. Hydraulic pressure at an inlet 66 acts on a piston 67 to move the central plunger 61 forwardly against the urging of the springs 62 and thus release the tool holder 16, when desired. A gear 69 is splined to the spindle 18 to the rear of the bearings 42, and may selectively be driven by a motor 70 for selective rotation of the spindle 18 when it mounts a rotative tool holder.

An annular piston 74 surrounds the spindle 18 and is within the support 41. Sleeve 76 is mounted in ring 44 which is secured to the inner end of support 41. Sleeve 75 extends between the piston and the bearings 42. Another sleeve 76 is mounted on spindle 18 and extends between the piston 74 and the conical roller bearing 43. A first dog clutch 79 acts on the support 41 by being unitary with a ring 81 secured to the outer end of the support 41. A second dog clutch 80 complementary to the first dog clutch acts on the spindle 18 and, as shown, it is welded to it. In the preferred embodiment, these dog clutches 79 and 80 are first and second curvic couplings which have relatively fine teeth, as shown in FIG. 5. As an example, these teeth may be only about 0.077 inch in depth. These curvic couplings are shown axially separated in the upper half of FIG. 4 and, as an example, this separation might be by a movement of the spindle 18 to the left a small distance, e.g., 0.094 inch. This displacement is shown relative to the lower half of FIG. 4 whereat the curvic couplings are shown in engagement.

First means 86 is provided to relatively move together the first and second dog clutches 79 and 80, as shown in the lower half of FIG. 4, and at the same time to unload the bearing 43. This is a combined thrust and radial bearing due to the conical races and the conical rollers. This first means 86 includes means to supply a relatively high pressure to a fluid inlet 88. This supplies a relatively large pressure, e.g., 1000 psi, of oil pressure, to a large face area 89 of the piston 74. This acts through the sleeve 76 to move the inner bearing race 90 axially outwardly. Since the rollers are conical in shape, this unloads the bearing 43 so that the rollers do not make simultaneous contact with the inner and outer races. At the same time, this axial outward movement of the spindle 18 moves the curvic couplings 79 and 80 into engagement. This locks the spindle rotatively to the support 41 with a considerable force of 10,000 pounds to make a rigid support for the tool holder 16. This means that the tool tip 54 may withstand vibration, off-center, and cantilever loads which are borne by the curvic couplings and not at all transmitted to the combined thrust and radial bearing 43. The ball bearings 42 are at the axial inner end of the spindle 10 and are far removed from this tool loading. As a consequence, they are not damaged by any vibration, off-center or cantilever load on the tool tip 54 but, instead, provide precise positioning of the inner axial end of the spindle 18.

Second means 87 is provided to relatively move apart the first and second dog clutches 79 and 80 to engage the conical roller bearing 43 for rotation of the spindle by the motor 70. This second means 87 includes a fluid inlet 91 to supply reduced pressure fluid to a smaller face 92 of the piston 74 to urge this piston rearwardly. This would be when the large pressure was removed from the face 89 of the piston. This relatively smaller pressure may be in the order of 100 psi, for example, which acts through the sleeve 75 and the bearings 42 to move the spindle rearwardly. This disengages the dog clutches 79 and 80 and engages the bearing 43. Preferably, this is a force which also preloads the bearing 43 so that a rotative tool in the spindle 18 may operate on a workpiece, whether the workpiece is rotating or stationary. This preload of the bearing 43 establishes a precise position of the rotative tool for accurate machining. This rotative tool may be any of the usual types, such as milling cutter, end mill, drill, tap, or even a boring tool.

It will be noted that the first and second means 86 and 87 are connected to axially move one of the spindle 18 and support 41 in opposing directions. In this preferred embodiment, the first and second means are connected to axially move the tool spindle in opposing directions. The invention has the advantage that the first means 86 is connected to move the tool spindle 18 forwardly out of the support 41 to engage the dog clutches 79 and 80. The first dog clutch 79 is fixed on the support 41, so upon engagement of the first and second dog clutches 79 and 80, the non-rotative tool, such as tool tip 54, is precisely positioned and securely held in that position for precise machining. The force of this first means 86 ia many times greater than the force of the second means. The area of the large face 59 of the annular piston 74 is about double that of the area of the small face 92, so that with the pressures disclosed, there is about twenty times more force locking this tool spindle in the forward axial position against rotation, compared with the rearward axial force which permits rotation and preloads the bearing 43. It will further be noted that the first means 86 and the second means 87 are each connected for relative axial movement of the dog clutches 79 and 80. The first means 86, for example, not only provides this relative axial movement, but also concurrently unloads the bearing 43 upon relative axial movement in one direction, in this case, an outward axial movement of the tool spindle 18. Similarly, the second means 87 moves the dog clutches 79 and 80 out of engagement and concurrently preloads the bearing 43 for rotation of the spindle by the motor 70. By this means, a workpiece 25 may be machined with a rotative tool in the tool spindle 18.

Figure 2:
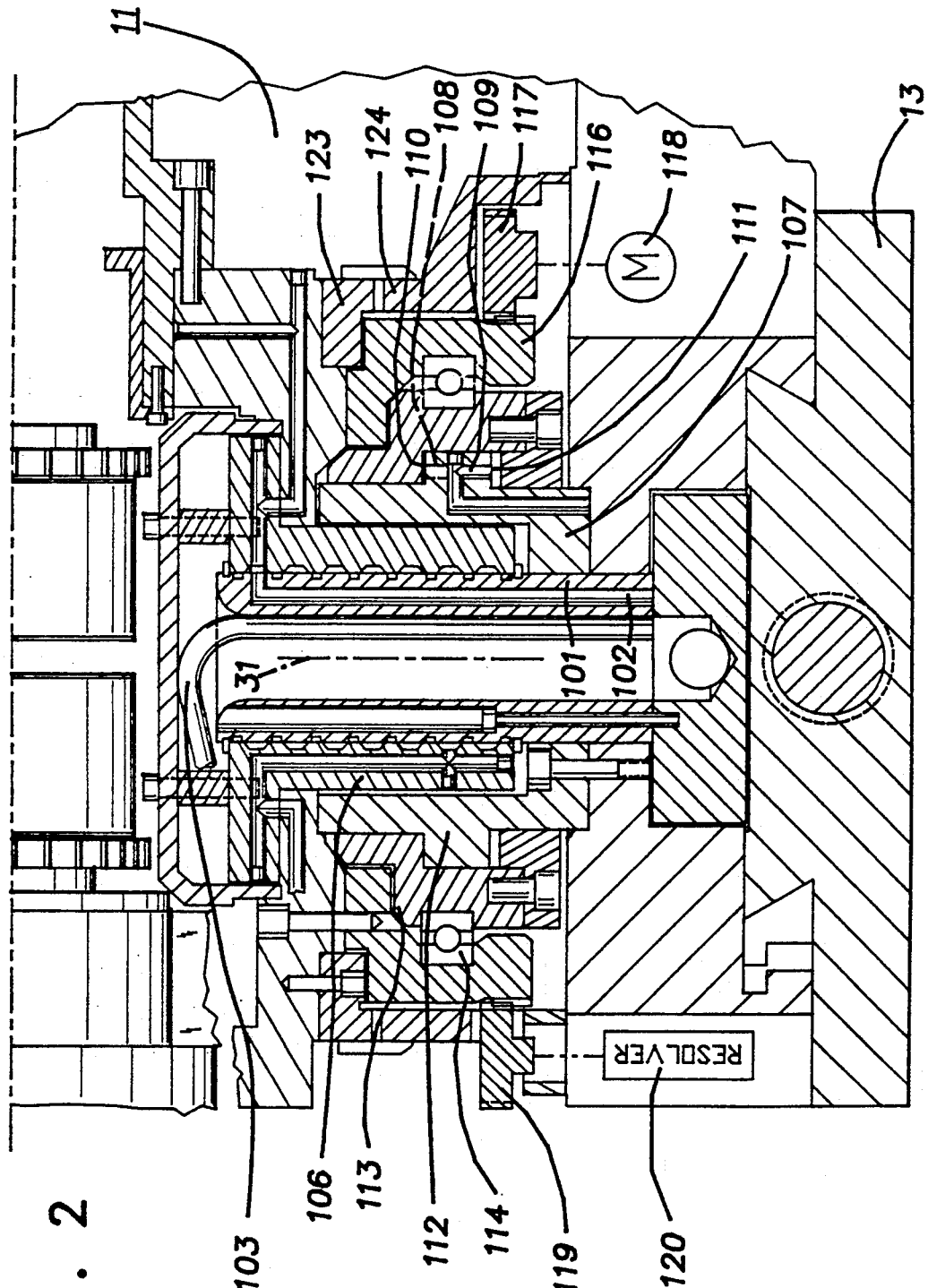
FIG. 2 is an elevational view, partly in section, of the lower part of a turret mechanism according to the invention.
Figure 3:
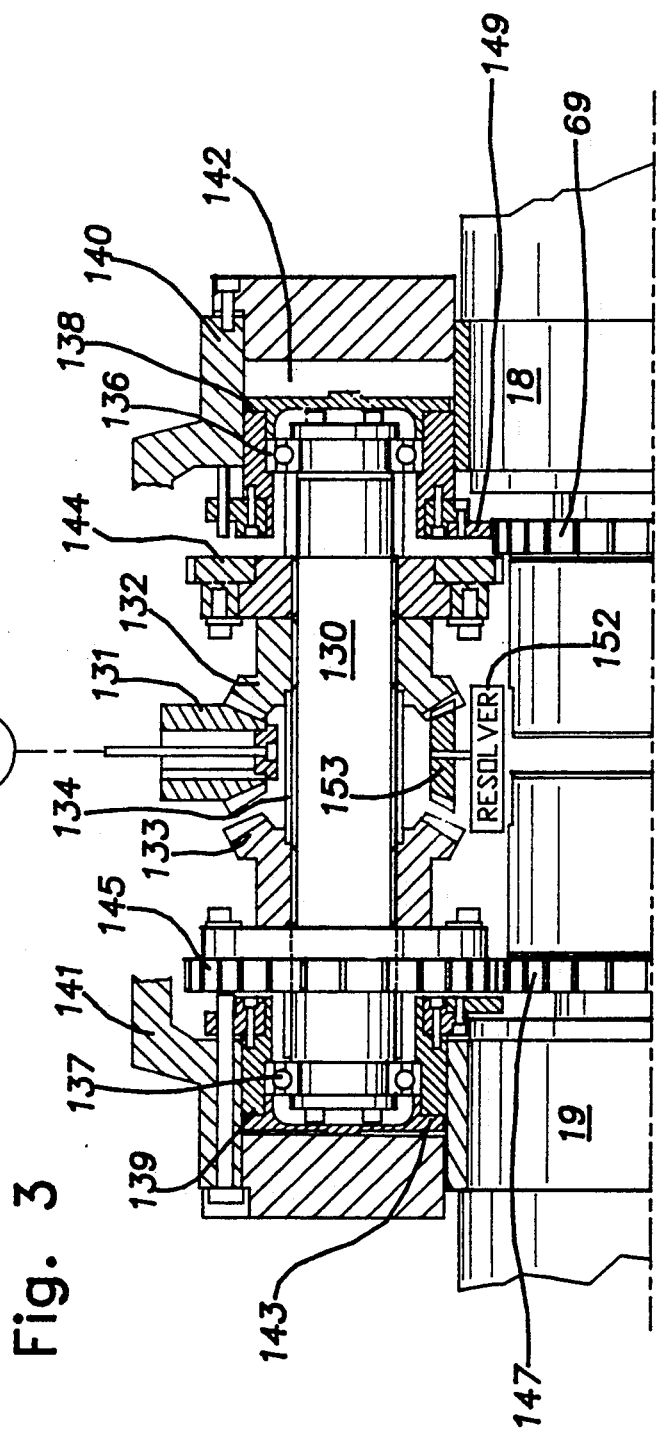
FIG. 3 is an elevational view, partly in section, of the upper part of a turret mechanism according to the invention.

FIGS. 2 and 3 show the construction of the turret 11. This is mounted on the cross slide 15 on which a hollow post 101 is fixed. In the walls of this hollow post are conduits such as conduit 102 for hydraulic fluid at low and high pressure, air pressure and return to sump. Within the hollow post are electrical cables 103 for connection between the various electrical devices within the turret 11 and control means 101 shown on FIG. 1. A sleeve 106 surrounds the hollow post 101 and forms with it a distributor to distribute the fluids in the various conduits 102 into the turret. This sleeve 106 rotates with the turret and interdrilled passages lead from the sleeve 106 to the various mechanisms in the turret and in the two tool spindles. The flange 107 of stationary annular piston 112 surrounds sleeve 106 and contains a conduit 108 and a conduit 109 leading to piston and cylinder spaces 110 and 111, respectively. The stationary annular piston 112 cooperates with the surrounding axially movable cylinder 113. Fluid pressure in the annular space 110 will raise the movable cylinder 113, and pressure in the annular space 111 will lower this movable cylinder to the position shown in FIG. 2. The raising action is transmitted through a bearing 114 to the turret 11. This bearing permits the turret 11 to rotate about the turret axis 31. The turret rotation is achieved by a ring gear 116 secured to the turret and driven by a pinion 117, which, in turn, is driven by a motor 118. Another pinion 119 is driven from the ring gear 116 and drives a resolver 120 which is connected to the control means 104 so as to obtain a determination of the rotational position of the turret 11.

The raising of the turret by fluid pressure at the annular space 110 raises the turret and with it a first curvic coupling 123 secured thereto which raises off engagement with a second curvic coupling 124 secured to the cross slide 15. In the preferred embodiment, this is a fine tooth curvic coupling providing 5° increments of positioning of the turret 11 about the axis 31. The raising motion of the turret need not be very much in view of the fine tooth nature of the curvic coupling. For example, it need be only about 0.20 inch, and such motion is readily accommodated by the pinion 117 and ring gear 116.

At the upper end of the turret 11 (shown in FIG. 3), a drive shaft 130 is journaled. The motor 70 is carried in the turret and drives a bevel gear 131 which meshes with and drives a first large bevel gear 132 or, alternatively, a second large bevel gear 133. These gears 132 and 133 are splined to the drive shaft 130 and separated by a spacer sleeve 134 so that the two gears 132 and 133 may not simultaneously engage the bevel gear 131. The drive shaft 130 is journaled by bearings 136 and 137 in pistons 138 and 139, respectively. These pistons are disposed in cylinders 140 and 141, respectively. Fluid pressure in one cylinder space 142 will move the two pistons, shaft 130, and bevel gears 132 and 133 to the left to the position as shown in FIG. 3. Correspondingly, fluid pressure in the cylinder space 143 will move these components to the right to the alternative position whereat bevel gear 131 is in mesh with gear 133.

In the position shown in FIG. 3, a gear 144 on the drive shaft 130 is not in mesh with the gear 69 on tool spindle 18, but gear 145 on the drive shaft 130 is in mesh with the gear 147 of the tool spindle 19, and hence this spindle will rotate, whereas spindle 18 is locked. It is locked from rotating by a fixed gear sector 149 moved with drive shaft 130 movement into mesh with the gear 69. Therefore, even if the tool holder 16 may have an overhanging load which would tend to rotate the tool spindle 18, it cannot be rotated due to this gear sector 149.

A resolver 152 is provided to keep track of rotational movement of the spindles 18 or 19, and as shown may be driven by a bevel gear 153. This resolver 152 is connected to the control means 104 to keep track of the position of each tool spindle 18 and 19. With one tool spindle always locked against rotation concurrently with the unlocking of the other tool spindle for rotation, the resolver 152 can determine the rotational position of each tool spindle 18 or 19. In each case, the motor 70 would rotate the tool spindle back to a zero or reference position so that the tool adapter drive key 52 will mesh with the keyway 53 during tool change. This tool change is diagrammatically shown in FIG. 1 with a tool change arm 94 pivotally mounted on an extension 95 carried on the cross slide 15. In this way, one tool holder 16 may be in the operative position to machine the workpiece 25 whereas the other toolholder 17 is being changed either to a rotating or a non-rotating tool.

FIG. 1 shows the turret 11 positioned with tool holder 16, a non-rotating turning tool, in the operative position for machining a rotating workpiece 25. If the turret 11 is indexed 180° about the turret axis 31, then the tool holder 17, such as a face milling cutter, may mill a face on the workpiece 25. The turret 11 is rotatable through a range including 0°, 90°, 180° and 270°, which range might be 270°, or might be 300° of movement. Since the turret need not be freely rotatable, the electrical cables 103 may be fixed in position rather than utilizing slip rings. The 270° range of movement will permit either tool holder 16 or 17 to be along the axis parallel to the c axis 26 or perpendicular to it. Also, the curvic coupling 123-124 permits a multitude of positions in between the 0° and 90° positions. For example, FIG. 1 shows turret 11 in a dotted position 11A at about a 40° angle to the c axis whereat a milling cutter 17A may mill a 40° face on the stationary workpiece 25. Therefore, the machine tool 10 is quite versatile in being able to perform many machining functions such as milling, drilling, tapping, cross drilling, cross tapping, face milling and OD and ID turning with either tool in either tool spindle and at a multitude of positions between 0° and 90° relative to the workpiece axis, for a very versatile machine tool. This is permitted by the alternative rotation or locking of each tool spindle and by the fact that the turret axis is perpendicular to the x-c plane so that as the turret is rotated about the turret axis 31, the tool holders remain in this x-c plane for an operative position at any angle. It will also be noted that the turret has an axis of rotation perpendicular to the x axis. The turret is rotatable about the turret axis into many positions in each of which one of the tool spindles is positioned for machining of a workpiece by a tool in that one tool spindle. The motor 70 is a drive means to rotate selectively each of the tool spindles 18 and 19. The control means 104 controls locking of alternative tool spindles by the closing of the curvic couplings on that respective tool spindle. Additionally, the gear sector 149 selectively locks that tool spindle not connected for rotation by the motor 70. The drive shaft 130, bevel gears 132 and 133, and gear sectors 149 are machine elements in the drive train selectively movable for drive of the first and second tool spindles and for locking the second and first tool spindles, respectively.

The position of the tool holders 16 and 17 shown in FIG. 1 may be considered a zero or reference position for machining or for tool change, at which position the drive key 52 will be positioned in the keyway 53.

The turret has means for positioning the turret about the turret axis which would include the motor 118. The positioning means includes four positions of the turret, for example, 0°, 90°, 180° and 270°, whereat each tool holder may be parallel to or perpendicular to the c axis. The positioning means is capable of positioning each tool holder of the turret in at least three positions in the x-c plane and, in fact, is capable of positioning each tool holder in a multitude of operative positions in the x-c plane. As an example, in FIG. 1 the dotted line position 11A of the turret shows this turret position at about a 40° angle relative to the solid line position thereof so that a 40° face may be machined on the workpiece 25.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A machine tool turret for a machine tool having a rotatable workpiece spindle rotatable about a c axis, comprising in combination:

first and second tool spindles journaled on said turret for rotation about first and second tool axes, respectively;

means mounting said turret for compound movement of said tool spindles in an x-c plane defined by an x axis perpendicular to said c axis;

means to lock each said tool spindle against rotation for machining of a rotating workpiece by a non-rotating tool in each said tool spindle, and for machining of a rotating or non-rotating workpiece by a rotating tool in each said tool spindle when unlocked and rotated; and including drive means to rotate selectively each of said tool spindles;

said drive means being a single motor connectable to rotate alternatively each of said tool spindles.

2. A machine tool as set forth in claim 1, wherein said lock means includes moveable elements which selectively lock that tool spindle not connected for rotation by said motor.

3. A machine tool having a tool turret and a rotatable workpiece spindle rotatable about a c axis;

first and second tool holders on said turret and disposed on first and second tool axes, respectively, the turret being mounted for compound movement of the tool holders in a plane defined by said c axis and an x axis perpendicular thereto; characterized by:

each said tool holder being rotatable about its own axis for machining of a rotating or non-rotating workpiece by a rotating tool in each said tool holder when rotated, and means to lock each said tool holder against rotation in at least one rotational position about its axis for machining of a rotating or non-rotating workpiece by a non-rotating tool in each said tool holder;

said lock means including elements selectively operable on each of said tool holders alternatively with effecting drive means for rotating the other of said tool holders.

4. A machine tool as set forth in claim 3, including control means and a resolver moved with the rotational one of said tool holders and connected to said control means to establish the rotational position of said rotational tool holder.

5. A machine tool turret for a machine tool having a rotatable workpiece spindle rotatable about a c axis comprising in combination:

first and second tool spindles journaled on said turret for rotation about first and second tool axes, respectively;

means mounting said turret for compound movement of said tool spindles in an x-c plane defined by an x axis perpendicular to said c axis;

means to lock each said tool spindle against rotation for machining of a rotating workpiece by a non-rotating tool in each said tool spindle, and for machining of a rotating or non-rotating workpiece by a rotating tool in each said tool spindle when unlocked and rotated; and drive means to rotate selectively each of said tool spindles, said drive means including a machine element in the drive train selectively movable for drive of said first and second tool spindles and for locking said second and first tool spindles, respectively.

* * * * *